United States Patent
Kooima et al.

[11] Patent Number: 5,823,449
[45] Date of Patent: Oct. 20, 1998

[54] AGRICULTURAL FEED MIXER BLADE

[76] Inventors: John C. Kooima, 2620 310th St.;
Philip G. Kooima, 2634 310th St., both
of Rock Valley, Iowa 51247

[21] Appl. No.: 897,899

[22] Filed: Jul. 21, 1997

[51] Int. Cl.[6] ............................ B02C 18/08; B02C 21/02
[52] U.S. Cl. ................ 241/27; 241/101.761; 241/260.1; 241/300; 241/605
[58] Field of Search ......................... 241/101.761, 260.1, 241/292.1, 300, 27, 605

[56] References Cited

U.S. PATENT DOCUMENTS

| | | |
|---|---|---|
| 4,068,688 | 1/1978 | Benson ............................. 241/292.1 X |
| 4,205,564 | 6/1980 | Kolb et al. . |
| 4,690,024 | 9/1987 | Chaconas . |
| 4,770,253 | 9/1988 | Hallissy et al. . |
| 5,020,918 | 6/1991 | Faccia .................................... 366/279 |
| 5,074,623 | 12/1991 | Hedlund et al. . |
| 5,082,188 | 1/1992 | Urich ........................................ 241/56 |
| 5,193,280 | 3/1993 | Jackson . |
| 5,331,876 | 7/1994 | Hayden, Sr. . |
| 5,351,595 | 10/1994 | Johnston . |
| 5,427,000 | 6/1995 | Hellbergh . |
| 5,456,416 | 10/1995 | Hartwig ............................... 241/260.1 |
| 5,553,937 | 9/1996 | Faccia ..................................... 366/302 |
| 5,613,537 | 3/1997 | Gassiott ........................... 241/292.1 X |
| 5,615,839 | 4/1997 | Hartwig ............................... 241/260.1 |
| 5,647,665 | 7/1997 | Schuler ............................ 241/260.1 X |

*Primary Examiner*—John M. Husar

[57] ABSTRACT

A new Agricultural Feed Mixer Blade for providing a mixer blade with improved impact and wear resistance. The inventive device includes a plate having a leading edge with a plurality of teeth arranged in a stepped contiguous relationship therealong, and an elongated cutting element affixed to a face edge of each of the teeth wherein the cutting element is formed of a substance harder than that of the plate such as a cemented carbide. The blade is mountable to the auger of the agricultural feed mixer whereby the leading edge of the plate substantially protrudes beyond a periphery of the auger.

24 Claims, 3 Drawing Sheets

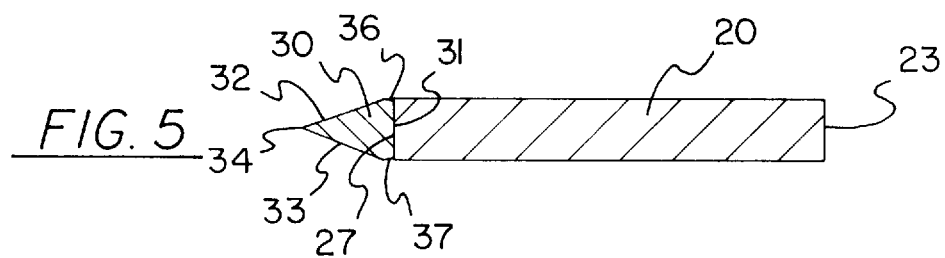
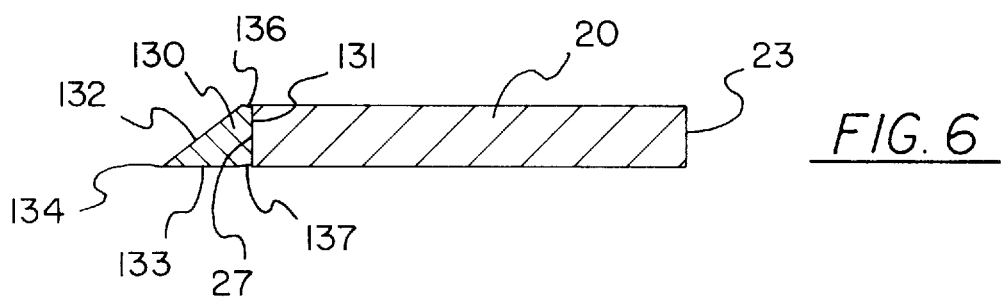
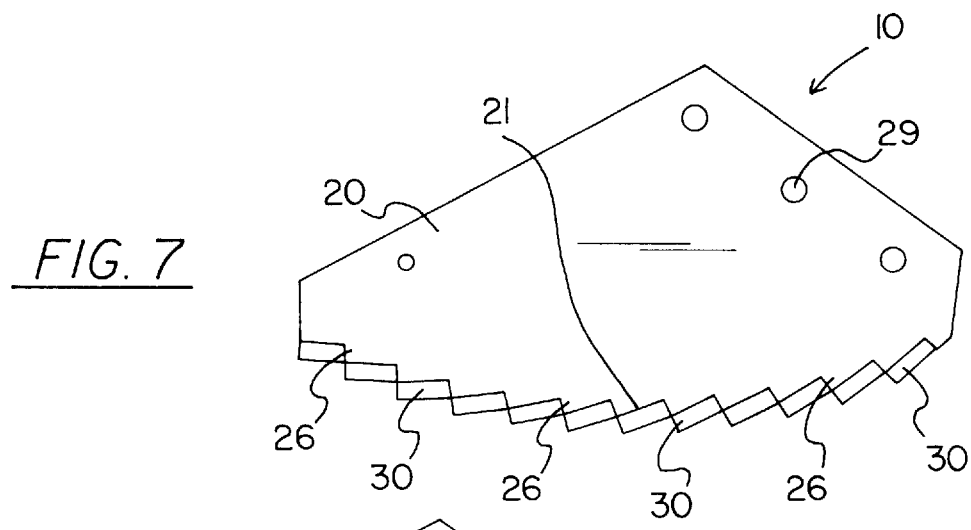
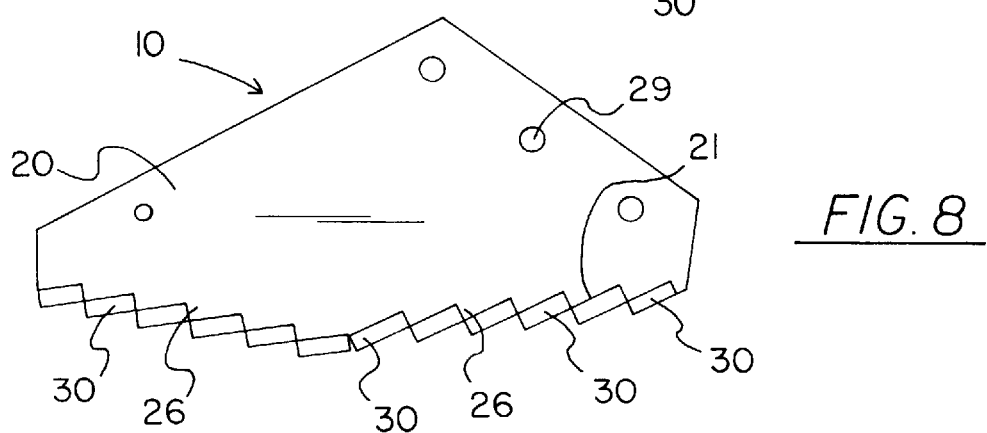

AGRICULTURAL FEED MIXER BLADE

BACKGROUND OF THE INVENTION

1. Field of the Invention

The present invention relates to cutting tools and more particularly pertains to a new Agricultural Feed Mixer Blade for providing a mixer blade with improved impact and wear resistance.

2. Description of the Prior Art

The use of cutting tools is known in the prior art. More specifically, cutting tools heretofore devised and utilized are known to consist basically of familiar, expected and obvious structural configurations, notwithstanding the myriad of designs encompassed by the crowded prior art which have been developed for the fulfillment of countless objectives and requirements.

Known prior art cutting tools include U.S. Pat. No. 4,205,564; U.S. Pat. No. 4,690,024; U.S. Pat. No. 4,770,253; U.S. Pat. No. 5,074,623; U.S. Pat. No. 5,193,280; U.S. Pat. No. 5,331,876; U.S. Pat. No. 5,351,595; and U.S. Pat. No. 5,427,000.

While these devices fulfill their respective, particular objectives and requirements, the aforementioned patents do not disclose a new Agricultural Feed Mixer Blade. The inventive device includes a plate having a leading edge with a plurality of teeth arranged in a stepped contiguous relationship therealong, and an elongated cutting element affixed to a face edge of each of the teeth wherein the cutting element is formed of a substance harder than that of the plate such as a cemented carbide.

In these respects, the Agricultural Feed Mixer Blade according to the present invention substantially departs from the conventional concepts and designs of the prior art, and in so doing provides an apparatus primarily developed for the purpose of providing a mixer blade with improved impact and wear resistance.

SUMMARY OF THE INVENTION

In view of the foregoing disadvantages inherent in the known types of cutting tools now present in the prior art, the present invention provides a new Agricultural Feed Mixer Blade construction wherein the same can be utilized for providing a mixer blade with improved impact and wear resistance.

The general purpose of the present invention, which will be described subsequently in greater detail, is to provide a new Agricultural Feed Mixer Blade apparatus and method which has many of the advantages of the cutting tools mentioned heretofore and many novel features that result in a new Agricultural Feed Mixer Blade which is not anticipated, rendered obvious, suggested, or even implied by any of the prior art cutting tools, either alone or in any combination thereof.

To attain this, the present invention generally comprises a plate having a leading edge with a plurality of teeth arranged in a stepped contiguous relationship therealong, and an elongated cutting element affixed to a face edge of each of the teeth wherein the cutting element is formed of a substance harder than that of the plate such as a cemented carbide.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Agricultural Feed Mixer Blade apparatus and method which has many of the advantages of the cutting tools mentioned heretofore and many novel features that result in a new Agricultural Feed Mixer Blade which is not anticipated, rendered obvious, suggested, or even implied by any of the prior art cutting tools, either alone or in any combination thereof.

It is another object of the present invention to provide a new Agricultural Feed Mixer Blade which may be easily and efficiently manufactured and marketed.

It is a further object of the present invention to provide a new Agricultural Feed Mixer Blade which is of a durable and reliable construction.

An even further object of the present invention is to provide a new Agricultural Feed Mixer Blade which is susceptible of a low cost of manufacture with regard to both materials and labor, and which accordingly is then susceptible of low prices of sale to the consuming public, thereby making such Agricultural Feed Mixer Blade economically available to the buying public.

Still yet another object of the present invention is to provide a new Agricultural Feed Mixer Blade which provides in the apparatuses and methods of the prior art some of the advantages thereof, while simultaneously overcoming some of the disadvantages normally associated therewith.

Still another object of the present invention is to provide a new Agricultural Feed Mixer Blade for providing a mixer blade with improved impact and wear resistance.

Yet another object of the present invention is to provide a new Agricultural Feed Mixer Blade which includes a plate having a leading edge with a plurality of teeth arranged in a stepped contiguous relationship therealong, and an elongated cutting element affixed to a face edge of each of the teeth wherein the cutting element is formed of a substance harder than that of the plate such as a cemented carbide.

Still yet another object of the present invention is to provide a new Agricultural Feed Mixer Blade that has a prolonged life. Mixer blades made of steel have the advantage of being relatively inexpensive, but also the disadvantage of wearing out extremely rapidly. Accordingly, once worn out, the steel blades must be replaced which, in addition to being time consuming, also results in downtime for the equipment. Thus, the present invention provides a mixer blade with an improved life span which resultantly reduces the occurrence of such replacement and eliminates the associated problems.

Even still another object of the present invention is to provide a new Agricultural Feed Mixer Blade that is adapted to more adequately address the harsh conditions often encountered during the mixing of agricultural feed including, more specifically, low revolution mixing (1 to 40 RPM range).

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a cross sectional view taken along line 5—5 of FIG. 3.

FIG. 6 is a view similar to FIG. 5 illustrating an optional embodiment of the cutting element of the present invention.

FIG. 7 is a top view of a first optional embodiment of the present invention.

FIG. 8 is a top view of a second optional embodiment of the present invention.

DESCRIPTION OF THE PREFERRED EMBODIMENT

Figure 1:
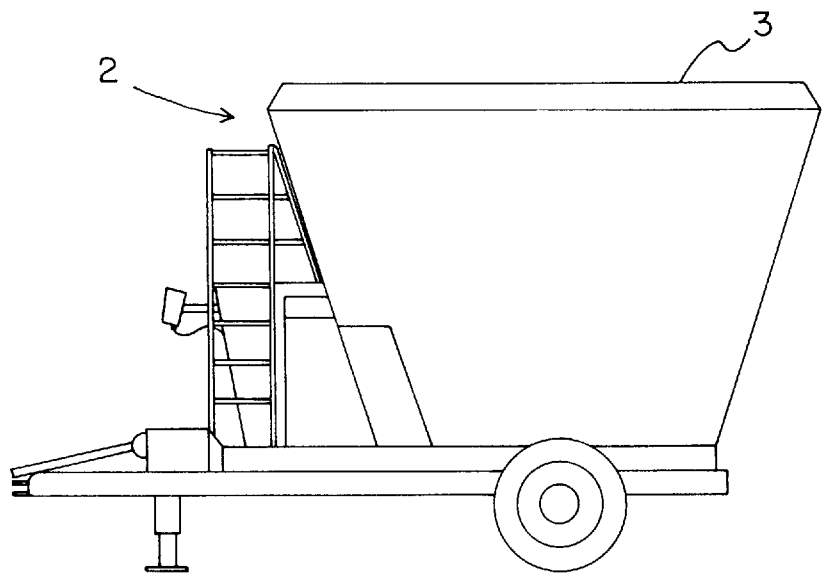
FIG. 1 is an illustration of an agricultural feed mixer establishing one environment of use of a new Agricultural Feed Mixer Blade according to the present invention.

With reference now to the drawings, and in particular to FIGS. 1 through 8 thereof, a new Agricultural Feed Mixer Blade embodying the principles and concepts of the present invention and generally designated by the reference numeral 10 will be described.

As best illustrated in FIGS. 1 through 8, the Agricultural Feed Mixer Blade 10 comprises a plate 20 having a leading edge 21 with a plurality of teeth 26 arranged in a stepped contiguous relationship therealong, and an elongated cutting element 30 affixed to a face edge 27 of each of the teeth 26 wherein the cutting element 30 is formed of a substance harder than that of the plate 20 such as a cemented carbide.

Figure 2:
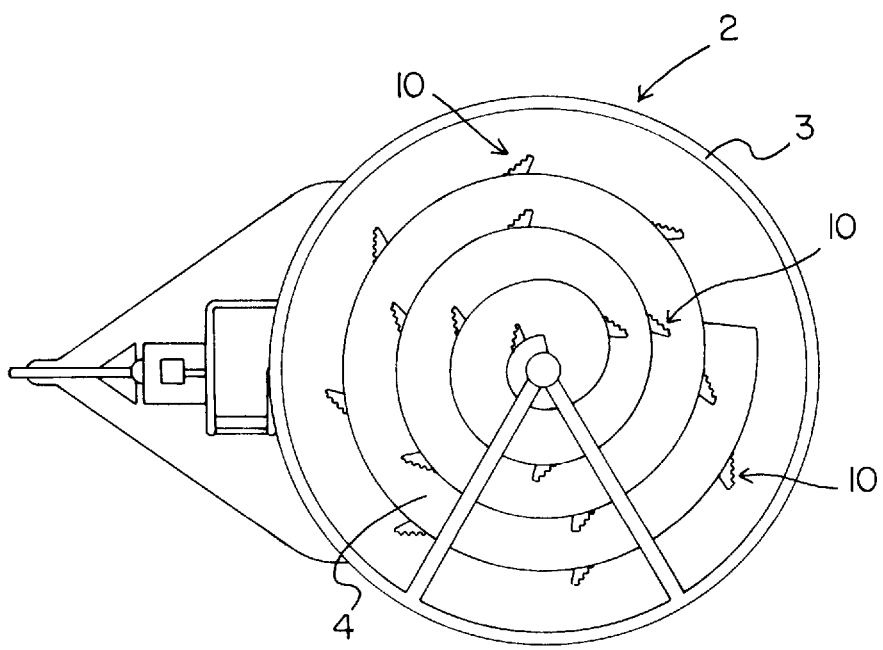
FIG. 2 is a top view of the mixing bin and the auger of the agricultural feed mixer with a plurality of Agricultural Feed Mixer Blades mounted on the auger according to the present invention.

As best illustrated in FIGS. 1 and 2, the Agricultural Feed Mixer Blade 10 of the present invention is intended for use in an agricultural feed mixer 2. The agricultural feed mixer 2 includes a mixing bin 3 with a tapered auger 4 rotatably mounted therein. Accordingly, a plurality of blades 10 are secured to the auger 4 in spaced relation over the length thereof. The plurality of blades 10 are mounted so as to protrude beyond the periphery of the auger 4. As such, the plurality of blades 10 and the auger 4 cut and mix agricultural feed placed in the mixing bin 3 including, more specifically, hay rations. Although the agricultural feed mixer 2 illustrated in the drawings is of the vertical auger-type, it is understood that the present invention may also be incorporated into the design of horizontal auger-type agricultural feed mixers.

The plate 20 is substantially planar and formed of steel. In the preferred embodiment, best illustrated in FIGS. 3 through 6, the plate 20 is generally triangular in shape. As such, the plate 20 has a leading edge 21, a first rear edge 22, and a second rear edge 23. Accordingly, the first rear edge 22 is oriented at a first angle A relative to the leading edge 21 and the second rear edge 23 is oriented at a second angle B relative to the first rear edge 22. The leading edge 21 of the plate 20 has an innermost end 21a and an outermost end 21b. Accordingly, a heel edge 24 is provided at an intersection of the first rear edge 22 and the innermost end 21a of the leading edge 21. In addition, a toe edge 25 is provided at an intersection of the second rear edge 23 and the outermost end 21b of the leading edge 21.

In an illustrative embodiment, the leading edge 21 of the plate 20 is about 17 inches long, the first rear edge 22 is about 8 inches long, and the second rear edge 23 is about 12 inches long. In addition, the first angle A is about 35 degrees and the second angle B is about 62 degrees. Furthermore, the heel edge 24 is oriented at an angle of about 80 degrees relative to the leading edge 21 and the toe edge 25 is generally perpendicularly oriented to the leading edge 21. In the illustrative embodiment, the plate 20 has a thickness of about ⅜ inch.

Figure 3:
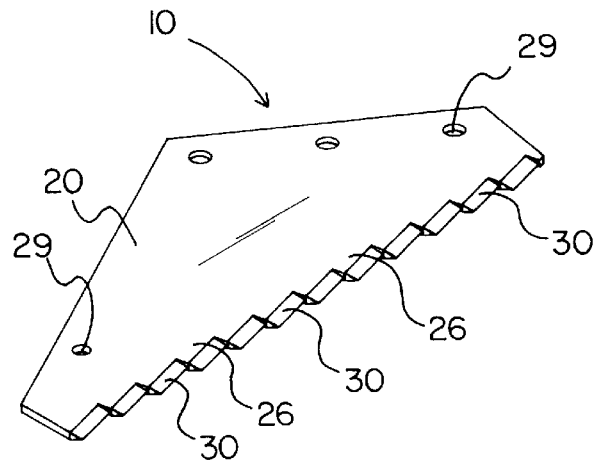
FIG. 3 is perspective illustration of the present invention.
Figure 4:
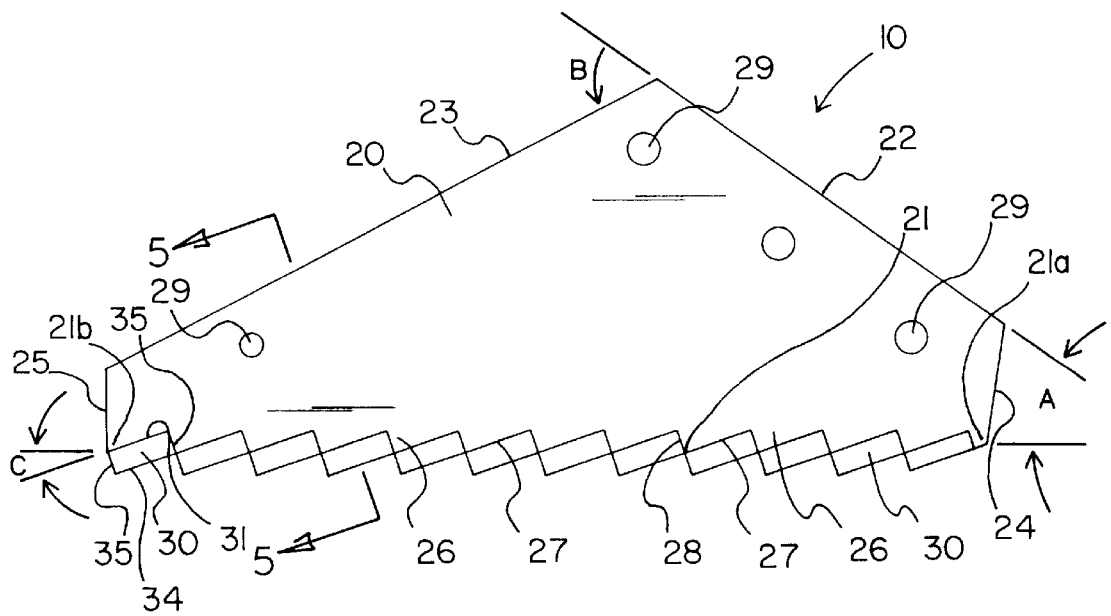
FIG. 4 is a top view of the present invention.

The leading edge 21 of the plate 20, as illustrated in FIGS. 3 and 4, is generally straight. However, as illustrated in FIGS. 7 and 8, the leading edge 21 of the plate 20 may also be generally convex or saliently angled. The saliently angled leading edge includes two edges oriented at an obtuse angle wherein the apex of the angle faces outward. Accordingly, the description herein generally applies to all embodiments of the leading edge 21.

The plurality of teeth 26 are arranged in a stepped contiguous relationship along the leading edge 21 of the plate 20. Each of the teeth 26 include a face edge 27 and a back edge 28. As such, the back edge 28 of a first tooth is contiguous with the face edge 27 of a second adjacent tooth. Accordingly, the back edge 28 of a first tooth and the face edge 27 of a second adjacent tooth form a triangular gullet between adjacent teeth 26. The face edge 27 of each of the teeth 26 arc oriented at an angle C relative to the leading edge 21 of the plate 20. The angle of orientation (angle C) of the teeth 26 varies according to the application so as to maximize the effective cutting edge of the blade 10. Preferably, the angle C is in the range of about 10 degrees to about 30 degrees. Most preferably, however, the angle C is in the range of about 15 degrees to about 25 degrees. In an illustrative embodiment, the angle C is about 19 degrees. Furthermore, the back edge 28 of a first tooth is generally perpendicularly oriented to the face edge 27 of a second adjacent tooth.

The plate 20 has a plurality of mounting holes 29 formed therein. The mounting holes 29 permit mounting of the blade 10 to the auger 4 of the agricultural feed mixer 2. In an illustrative embodiment, a set of three mounting holes 29 are provided in spaced relation along the first rear edge 22 of the plate 20. In addition, a single mounting hole 29 is provided along the second rear edge 23 towards the toe edge 25 of the plate 20.

In the preferred embodiment, each of the cutting elements 30 are formed of a cemented carbide material. Preferably, the cemented carbide material has a low cobalt content thereby increasing hardness and wear resistance. Most preferably, the cobalt content is in the range of about 2 to about 13 percent. In an illustrative embodiment, the composition of the cemented carbide material by weight is about 90 percent tungsten carbide and about 10 percent cobalt.

In a first embodiment, each of the cutting elements 30 has a generally triangular profile (FIG. 7). As such, each of the cutting elements 30 has a rear surface 31, an angled top surface 32, and an angled bottom surface 33 wherein the angled top surface 32 and the angled bottom surface 33 converge to form a cutting edge 34. Furthermore, each of the cutting elements 30 has a pair of end surfaces 35. Each of the cutting elements 30 has a top chamfer 36 provided along an intersection of the angled top surface 32 and the rear surface 31 and has a bottom chamfer 37 provided along an intersection of the angled bottom surface 33 and the rear surface 31. In addition, an end chamfer (not shown) is provided along an intersection of each of the end surfaces 35 and the rear surface 31.

In a second embodiment, each of the cutting elements 130 has a generally wedge-shaped profile (FIG. 8). As such, each of the cutting elements 130 has a rear surface 131, an angled top surface 132, and a bottom surface 133 wherein the angled top surface 132 intersects the bottom surface 133 to form a cutting edge 134. Furthermore, each of the cutting elements 130 has a pair of end surfaces 135. Each of the cutting elements 130 has a top chamfer 136 provided along an intersection of the angled top surface 132 and the rear surface 131 and has a bottom chamfer 137 provided along an intersection of the bottom surface 133 and the rear surface 131. In addition, an end chamfer (not shown) is provided along an intersection of each of the end surfaces 135 and the rear surface 131.

Each of the cutting elements 30 are secured to the teeth 26 by brazing. The cutting elements 30 are of a length generally equal to that of the face edge 27 of the teeth 26. As such, the rear surface 31 and one of the end surfaces 35 of each of the cutting elements 30 are brazed to the face edge 27 and the back edge 28, respectively, of adjacent teeth. In the preferred embodiment, the face edge 27 of each of the teeth 26 is of a length substantially greater than that of the back edge 28. Accordingly, in an illustrative embodiment, the face edge 27 of each of the teeth 26 is about 1.3 inches and the back edge 28 is about 0.5 inches. As such, the cutting edge 34 of each of the cutting elements 30 is about 1.3 inches. In addition, the thickness of each of the cutting elements 30 is generally equal to the thickness of the plate 20. As such, the height of the rear surface 31 of the cutting element 30 is generally equal to the thickness of the plate 20. Accordingly, in an illustrative embodiment, the height of the rear surface 31 of the cutting element 30 is ⅜.

In use, a plurality of blades 10 are mounted on the auger 4 of the agricultural feed mixer 2 in spaced relation over the length of the auger 4. The blades 10 are mounted on the auger 4 such that the leading edge 21 of the plate 20 substantially protrudes beyond the periphery of the auger 4. Agricultural feed desired to be mixed is placed within the mixing bin 3 whereby the plurality of blades 10 and the auger 4 cut and mix the agricultural feed.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A blade for use in an agricultural feed mixer including an auger, comprising:

a plate having a leading edge with a plurality of teeth arranged in a stepped contiguous relationship therealong, each of said plurality of teeth having a face edge and a back edge, said back edge of each of said plurality of teeth being contiguous with said face edge of an adjacent one of said plurality of teeth, said back edge of each of said plurality of teeth being oriented substantially perpendicular to said face edge of an adjacent one of said plurality of teeth to form a notch; and a plurality of elongate cutting elements, each of said cutting elements being affixed to said face edge of each of said plurality of teeth in a position adjacent to said back edge of an adjacent one of said plurality of teeth such that an end of each of said cutting elements is located in one of said notches, said cutting element being formed of a cemented carbide material, said blade mountable to said auger of said agricultural feed mixer whereby said leading edge of said plate protrudes beyond a periphery of said auger.

2. The blade of claim 1, wherein said leading edge of said plate is of a shape that is one of generally straight, generally convex, and saliently angled.

3. The blade of claim 1, wherein said face edge of each of said plurality of teeth is of a length greater than that of said back edge thereof.

4. The blade of claim 1, wherein each of said cutting elements has a cutting edge, and wherein the cutting edges of said cutting elements are oriented substantially parallel to each other.

5. The blade of claim 1, wherein each of said cutting elements has a cutting edge, and wherein the cutting edge extends along the elongate direction of said cutting element.

6. The blade of claim 1, wherein each of said cutting elements has a cutting edge, and wherein the cutting edges of said cutting elements are oriented substantially parallel to each other and the cutting edges lie in substantially the same plane.

7. The blade of claim 1, wherein said cemented carbide material has a composition by weight of about 90 percent tungsten carbide and about 10 percent cobalt and wherein said plate comprises steel.

8. The blade of claim 1, wherein each of said cutting elements is brazed to one of said plurality of teeth.

9. The blade of claim 1, wherein said cutting element has a rear surface, a cutting edge opposite said rear surface, and a pair of end surfaces, wherein said cutting element is of a length generally equal to that of said face edge of said plurality of teeth, wherein said rear surface of said cutting element is affixed to said face edge of one of said plurality of teeth, and wherein one of said pair of end surfaces of said cutting element abuts against said back edge of an adjacent one of said plurality of teeth such that said cutting elements are arranged on said leading edge of said plate substantially without a gap between said cutting elements to thereby protect said leading edge of said plate.

10. The blade of claim 9, wherein said cutting element is of a length generally equal to that of said face edge of said plurality of teeth, and wherein said rear surface of said cutting element is of a height generally equal to a thickness of said plate.

11. The blade of claim 9, wherein said cutting element has a generally triangular profile and includes an angled top surface and an angled bottom surface, said angled top surface and said angled bottom surface converging to form said cutting edge, said angled top surface and said angled bottom surface each having a width extending perpendicular to said cutting edge, the width of said top and bottom surfaces being substantially equal to form a substantially symmetrical triangular profile.

12. The blade of claim 9, wherein said cutting element has a generally wedge-shaped profile and includes an angled top surface and a bottom surface, said angled top surface intersecting said bottom surface to form said cutting edge, said angled top surface and said angled bottom surface each having a width extending perpendicular to said cutting edge, the width of one of said top and bottom surfaces being greater than the width of the other of said top and bottom surfaces.

13. A blade for use in an agricultural feed mixer including an auger, comprising:
a generally triangular plate having a leading edge, a first rear edge, and a second rear edge, said plate including a plurality of teeth along said leading edge, said plurality of teeth arranged in a stepped contiguous relationship along said leading edge,
each of said plurality of teeth having a face edge and a back edge, said back edge of each of said plurality of teeth being contiguous with and generally perpendicularly oriented to said face edge of an adjacent one of said plurality of teeth to form a notch; and
a plurality of elongated cutting elements, each of said cutting elements being affixed to each of said plurality of teeth, said cutting element having a rear surface, a cutting edge opposite said rear surface, and a pair of end surfaces, said cutting element being located in said notch with said rear surface of said cutting element being affixed to said face edge of one of said plurality of teeth and one of said pair of end surfaces of said cutting element abutting against said back edge of an adjacent one of said plurality of teeth such that said cutting elements are arranged on said leading edge of said plate substantially without a gap between said cutting elements to thereby protect said leading edge of said plate, said cutting edge of each of said cutting being oriented generally parallel to an adjacent portion of said leading edge of said plate, said cutting edges of said cutting elements being oriented in substantially the same plane;
said cutting element being a cemented carbide cutting element,
said cutting element being of a length generally equal to that of said face edge of said plurality of teeth,
said blade being mountable to said auger of said agricultural feed mixer whereby said leading edge of said plate substantially protrudes beyond a periphery of said auger.

14. The blade of claim 13, wherein said leading edge of said plate is of a shape that is one of generally straight, generally convex, and saliently angled.

15. The blade of claim 13, wherein
said leading edge has an innermost end and an outermost end, wherein
said plate has a heel edge provided at an intersection of said first rear edge and said innermost end of said leading edge, and wherein
said plate has a toe edge provided at an intersection of said second rear edge and said outermost end of said leading edge.

16. The blade of claim 13, wherein said face edge of each of said plurality of teeth is of a length greater than that of said back edge thereof.

17. The blade of claim 13, wherein each of said cutting elements has a cutting edge, and wherein the cutting edge extends along the elongate direction of said cutting element.

18. The blade of claim 13, wherein the cutting edges of each of said plurality of cutting edges is oriented substantially parallel to each other.

19. The blade of claim 13, wherein said cemented carbide cutting element has a composition by weight of about 90 percent tungsten carbide and about 10 percent cobalt, and wherein said plate comprises steel.

20. The blade of claim 13, wherein each of said cutting elements is brazed to one of said plurality of teeth.

21. The blade of claim 13, wherein said cutting element has a generally triangular profile and includes an angled top surface and an angled bottom surface, said angled top surface and said angled bottom surface converging to form said cutting edge, said angled top surface and said angled bottom surface each having a width extending perpendicular to said cutting edge, the width of said top and bottom surfaces being substantially equal to form a substantially symmetrical triangular profile.

22. The blade of claim 13, wherein said cutting element has a generally wedge-shaped profile and includes an angled top surface and a bottom surface, said angled top surface intersecting said bottom surface to form said cutting edge, said angled top surface and said angled bottom surface each having a width extending perpendicular to said cutting edge, the width of one of said top and bottom surfaces being greater than the other of said top and bottom surfaces.

23. A method of mixing agricultural feed, comprising the steps of:
(a) providing an agricultural feed mixer including a mixing bin and an auger rotatably mounted therein;
(b) providing a plurality of blades, each blade comprising a a generally triangular plate having a leading edge, a first rear edge, and a second rear edge, said plate including a plurality of teeth along said leading edge, said plurality of teeth arranged in a stepped contiguous relationship along said leading edge, each of said plurality of teeth having a face edge and a back edge, said back edge of each of said plurality of teeth being contiguous with and generally perpendicularly oriented to said face edge of an adjacent one of said plurality of teeth to form a notch, and a plurality of elongated cutting elements, each of said cutting elements being affixed to each of said plurality of teeth, said cutting element having a rear surface, a cutting edge opposite said rear surface, and a pair of end surfaces, said cutting element being located in said notch with said rear surface of said cutting element being affixed to said face edge of one of said plurality of teeth and one of said pair of end surfaces of said cutting element abutting against said back edge of an adjacent one of said plurality of teeth such that said cutting elements are arranged on said leading edge of said plate substantially without a gap between said cutting elements to thereby protect said leading edge of said plate, said cutting edge of each of said cutting being oriented generally parallel to an adjacent portion of said leading edge of said plate, said cutting edges of said cutting elements being oriented in substantially the same plane, said cutting element being a cemented carbide cutting element harder than the material forming said plate, said cutting element being of a length generally equal to that of said face edge of said plurality of teeth;

(c) mounting each of said plurality of blades on said auger in spaced relation over a length thereof, said plurality of blades being mounted on said auger such that said leading edge of said plate substantially protrudes beyond a periphery of said auger; and (d) placing agricultural feed within said mixing bin of said agricultural feed mixer and operating said agricultural feed mixer whereby said plurality of blades and said auger cut and mix said agricultural feed placed within said mixing bin.

24. A blade for use in an agricultural feed mixer including an auger, comprising:

a generally triangular steel plate having a leading edge, a first rear edge, and a second rear edge, said plate including a plurality of teeth along said leading edge, said plurality of teeth arranged in a stepped contiguous relationship along said leading edge, each of said plurality of teeth having a face edge and a back edge, said back edge of each of said plurality of teeth being contiguous with and generally perpendicularly oriented to said face edge of an adjacent one of said plurality of teeth to form a notch; and a plurality of elongated cutting elements, each of said cutting elements being affixed to each of said plurality of teeth, said cutting element having a rear surface, a cutting edge opposite said rear surface, and a pair of end surfaces, said cutting element being located in said notch with said rear surface of said cutting element being affixed to said face edge of one of said plurality of teeth and one of said pair of end surfaces of said cutting element abutting against said back edge of an adjacent one of said plurality of teeth such that said cutting elements are arranged on said leading edge of said plate substantially without a gap between said cutting elements to thereby protect said leading edge of said plate, said cutting edge of each of said cutting being oriented generally parallel to an adjacent portion of said leading edge of said plate, said cutting edges of said cutting elements being oriented in substantially the same plane;

said cutting element being a cemented carbide cutting element;

said cutting element being of a length generally equal to that of said face edge of said plurality of teeth and said rear surface of said cutting element being of a height generally equal to a thickness of said plate;

said blade being mountable to said auger of said agricultural feed mixer whereby said leading edge of said plate substantially protrudes beyond a periphery of said auger;

wherein said back edge of each of said plurality of teeth is generally perpendicularly oriented to said face edge of an adjacent one of said plurality of teeth to form a substantially orthogonal notch for receiving a cutting element;

wherein said plate has a plurality of mounting holes therein;

wherein the cutting edges of each of said plurality of cutting edges is oriented substantially parallel to each other;

wherein said cemented carbide cutting element has a composition by weight of about 90 percent tungsten carbide and about 10 percent cobalt, and wherein said plate comprises steel;

wherein each of said cutting elements is brazed to one of said plurality of teeth, wherein said cutting element has a generally triangular profile and includes an angled top surface and an angled bottom surface, said angled top surface and said angled bottom surface converging to form said cutting edge, said angled top surface and said angled bottom surface each having a width extending perpendicular to said cutting edge, the width of said top and bottom surfaces being substantially equal to form a substantially symmetrical triangular profile;

wherein said cutting element has a generally wedge-shaped profile and includes an angled top surface and a bottom surface, said angled top surface intersecting said bottom surface to form said cutting edge, said angled top surface and said angled bottom surface each having a width extending perpendicular to said cutting edge, the width of one of said top and bottom surfaces being greater than the other of said top and bottom surfaces.

* * * * *